(12) United States Patent
Pai et al.

(10) Patent No.: US 12,539,038 B2
(45) Date of Patent: Feb. 3, 2026

(54) EYE TRACKING APPARATUS AND METHOD

(71) Applicant: HTC Corporation, Taoyuan (TW)

(72) Inventors: Li-Chieh Pai, Taoyuan (TW); Yan-Min Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/644,123

(22) Filed: Apr. 24, 2024

(65) Prior Publication Data

US 2024/0382088 A1 Nov. 21, 2024

Related U.S. Application Data

(60) Provisional application No. 63/502,925, filed on May 18, 2023.

(51) Int. Cl.
*A61B 3/113* (2006.01)
*A61B 90/00* (2016.01)
*G06T 7/00* (2017.01)

(52) U.S. Cl.
CPC ............ *A61B 3/113* (2013.01); *A61B 90/361* (2016.02); *G06T 7/0012* (2013.01); *G06T 2207/30041* (2013.01)

(58) Field of Classification Search
CPC .................. A61B 3/113; A61B 90/361; G06T 2207/30041; G06T 7/0012
USPC .......................................................... 348/78
See application file for complete search history.

(56) References Cited

U.S. PATENT DOCUMENTS

| 2018/0096520 A1* | 4/2018 | Yoshimura | ............... G06T 15/50 |
| 2022/0051418 A1* | 2/2022 | Heo | ...................... G06V 40/193 |

FOREIGN PATENT DOCUMENTS

| CN | 111902070 A | * | 11/2020 | ............. A61B 3/113 |
| CN | 112949370 A | * | 6/2021 | ............. G06F 3/013 |
| CN | 114581514 A | | 6/2022 | |
| CN | 114637393 A | | 6/2022 | |
| JP | WO2020170455 A1 | * | 12/2021 | ............... G09G 3/20 |
| WO | WO-2019187808 A1 | * | 10/2019 | ........... A61B 3/0008 |

OTHER PUBLICATIONS

The office action of the corresponding Taiwanese application No. TW113117688 issued on Feb. 8, 2025.

* cited by examiner

*Primary Examiner* — Behrooz M Senfi
(74) *Attorney, Agent, or Firm* — CKC & Partners Co., LLC (57) ABSTRACT

An eye tracking apparatus and method are provided. The eye tracking apparatus is configured to execute the following operations. The apparatus obtains a first single-eye image of a first eye at a first time point and a first single-eye image of a second eye at a second time point based on a plurality of eye images of a user. The apparatus calculates a first sight direction based on the first single-eye image of the first eye at the first time point and calculates a second sight direction based on the first single-eye image of the second eye at the second time point. The apparatus generates a combined gaze based on the first sight direction and the second sight direction at the second time point.

18 Claims, 4 Drawing Sheets

EYE TRACKING APPARATUS AND METHOD

CROSS-REFERENCE TO RELATED APPLICATION

This application claims priority to U.S. Provisional Application Ser. No. 63/502,925, filed May 18, 2023, which is herein incorporated by reference in its entirety.

BACKGROUND

Field of Invention

The present disclosure relates to an eye tracking apparatus and method. More particularly, the present disclosure relates to an eye tracking apparatus and method for increasing refresh rates.

Description of Related Art

In the application of virtual reality (VR), augmented reality (AR), or other technology, it is necessary to use eye tracking technology to determine where the user's eyes are gazing at, and then reflect it on the display screen (e.g., moving a cursor).

However, the existing eye tracking technology needs images of the user's eyes to calculate sight directions of the eyes. Therefore, if the computing speed of the sight direction cannot be increased, the refresh rate (e.g., frame rate) of the display screen will be difficult to increase due to hardware limitations, resulting in poor user experience.

In view of this, how to increase the calculation efficiency of the user's gaze position is the goal that the industry strives to work on.

SUMMARY

The disclosure provides an eye tracking apparatus comprises a camera and a processor. The camera is configured to capture a plurality of eye images of the user in a time sequence. coupled to the camera. The processor is configured to obtain a first single-eye image of a first eye at a first time point and a first single-eye image of a second eye at a second time point based on the eye images. The processor is further configured to calculate a first sight direction based on the first single-eye image of the first eye at the first time point and calculate a second sight direction based on the first single-eye image of the second eye at the second time point. The processor is further configured to generate a combined gaze based on the first sight direction and the second sight direction at the second time point.

The disclosure further provides an eye tracking method, being adapted for use in an electronic apparatus, wherein the eye tracking method comprises the following steps: obtaining a first single-eye image of a first eye at a first time point and a first single-eye image of a second eye at a second time point based on a plurality of eye images of a user; calculating a first sight direction based on the first single-eye image of the first eye at the first time point and calculating a second sight direction based on the first single-eye image of the second eye at the second time point; and generating a combined gaze based on the first sight direction and the second sight direction at the second time point.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
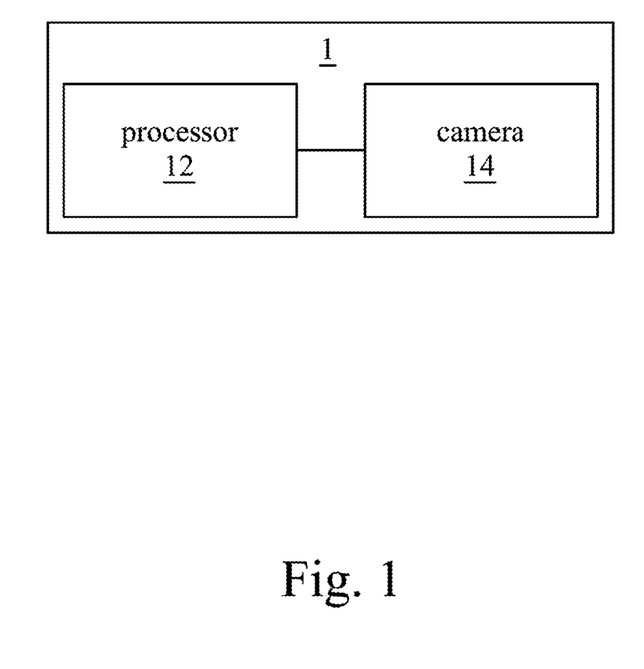
FIG. 1 is a schematic diagram illustrating an eye tracking apparatus according to a first embodiment of the present disclosure.

Please refer to FIG. 1, which is a schematic diagram illustrating an eye tracking apparatus according to a first embodiment of the present disclosure. The eye tracking apparatus 1 comprises a processor 12 and a camera 14, wherein the processor 12 is coupled to the camera 14. The eye tracking apparatus 1 is configured to determine the gaze position of user's eyes based on images of the eyes, wherein the eye tracking apparatus 1 can increase the update efficiency by generating the combine gaze using a single-eye image. In some embodiments, the eye tracking apparatus 1 is integrated in a head-mounted display. Accordingly, the eye tracking apparatus 1 can increase the frame rate of the head-mounted display.

In some embodiments, the processor 12 comprises a central processing unit (CPU), a graphics processing unit (GPU), a multi-processor, a distributed processing system, an application specific integrated circuit (ASIC), and/or a suitable processing unit.

In some embodiments, the camera 14 comprises one or more image capture unit capturing the user's eyes and configured to capture a plurality of eye images of the user in a time sequence. In some embodiments, the camera 14 comprises an image capture unit capturing both eyes of the user. In other embodiments, the camera 14 also comprises multiple image capture units capturing both eyes of the user separately, e.g., each of the user's eyes is captured by an image capture unit, or each of the user's eyes is captured by multiple image capture units.

First, after capturing eye images of the user, the processor 12 processes a first single-eye image of a first eye of a user at a first time point based on the eye images.

For example, if the camera 14 captures the user's eyes by using multiple image capture units separately, the processor 12 selects a single-eye image of one of the eyes of the user (e.g., the left eye or the right eye) from the eye images directly.

In some embodiments, for increasing the efficient of the image processing, the camera 14 merges multiple images into a larger eye images by firmware after multiple image capture units capture multiple images from various perspectives. Specifically, each of the eye images is generated by merging a left eye image and a right eye image. For example, through firmware design, the eye tracking apparatus 1 merges the images to create the eye image. It does this by obtaining a left eye image from the image capture unit that captures a left eye and a right eye image from the image capture unit that captures a right eye.

Correspondingly, in order to save computing time, the processor 12 can crop the eye image into a smaller single-eye image and use an image recognition model to determine the position of the user's one eye in the eye image.

Specifically, the processor 12 recognizes a position of the first eye in one of the eye images by using an image recognition model; and the processor 12 retrieves the first single-eye image from the one of the eye images based on the position of the first eye.

For example, the processor 12 can recognize an eye position in the eye image by using an image recognition model based on You Only Look Once (YOLO) or other image recognition algorithm and crop the eye image to obtain the single-eye image accordingly.

After obtaining the single-eye image, the eye tracking apparatus 1 calculates the sight direction of the eye of the user accordingly. Specifically, the processor 12 calculates a first sight direction based on the first single-eye image of the first eye.

In some embodiments, the operation of calculating the first sight direction further comprises the processor 12 calculating a position of the first eye in the first single-eye image of the first eye to calculate the first sight direction.

For example, the processor 12 can calculate a relative position of the pupil in the eye socket based on the single-eye image and determine the sight direction of the eye accordingly.

Similarly, after calculating the sight direction of one eye, the eye tracking apparatus 1 further processes a first single-eye image of another eye at a second time point based on the eye images. Accordingly, the eye tracking apparatus 1 then calculates the sight direction of another eye.

Specifically, the processor 12 obtains a first single-eye image of a second eye at a second time point based on the eye images and calculates a second sight direction based on the first single-eye image of the second eye at the second time point.

It is noted that, the calculation of the sight direction of the second eye is based on a single-eye image corresponding to another time point (i.e., a second time point) different from the first time point. In other words, the eye tracking apparatus 1 uses single-eye images at different time points (i.e., the first time point and the second time point) to calculate sight directions of two eyes separately. Also, the eye tracking apparatus 1 calculates the sight direction of the first eye and the sight direction of the second eye at different time points (i.e., the first time point and the second time point).

For example, after calculating the sight direction of the first eye, the eye tracking apparatus 1 obtains the latest single-eye image of the second eye and calculates the sight direction of the second eye correspondingly in order to obtain the latest sight direction of the second eye.

In some embodiments, the second time point is later than the first time point.

After calculating the sight directions, the processor 12 generates the combine gaze of the user based on the sight directions of both eyes. In other words, the eye tracking apparatus 1 combines the sight directions corresponding to different time points to generate a gaze position of both eyes of the user accordingly.

Specifically, the processor 12 generates a combine gaze based on the first sight direction and the second sight direction.

Furthermore, in some embodiments, after each of the sight direction of the eye is tracked, the eye tracking apparatus 1 generates the combine gaze accordingly in the next operation.

Specifically, the processor 12 obtains a second single-eye image of the first eye at a third time point based on the eye images, wherein the third time point is later than the first time point and the second time point; the processor 12 calculates a third sight direction based on the second single-eye image of the first eye at the third time point; and the processor 12 generates the combined gaze based on the second sight direction and the third sight direction at the third time point.

Similarly, in some embodiments, the eye tracking apparatus 1 tracks the sight directions of two eyes in turn to make sure the combined gaze is not deviated.

Specifically, the processor 12 obtains a second single-eye image of the second eye at a fourth time point based on the eye images, wherein the fourth time point is later than the third time point; the processor 12 calculates a fourth sight direction based on the second single-eye image of the second eye at the fourth time point; and the processor 12 generates the combined gaze based on the third sight direction and the fourth sight direction at the fourth time point.

Figure 2:
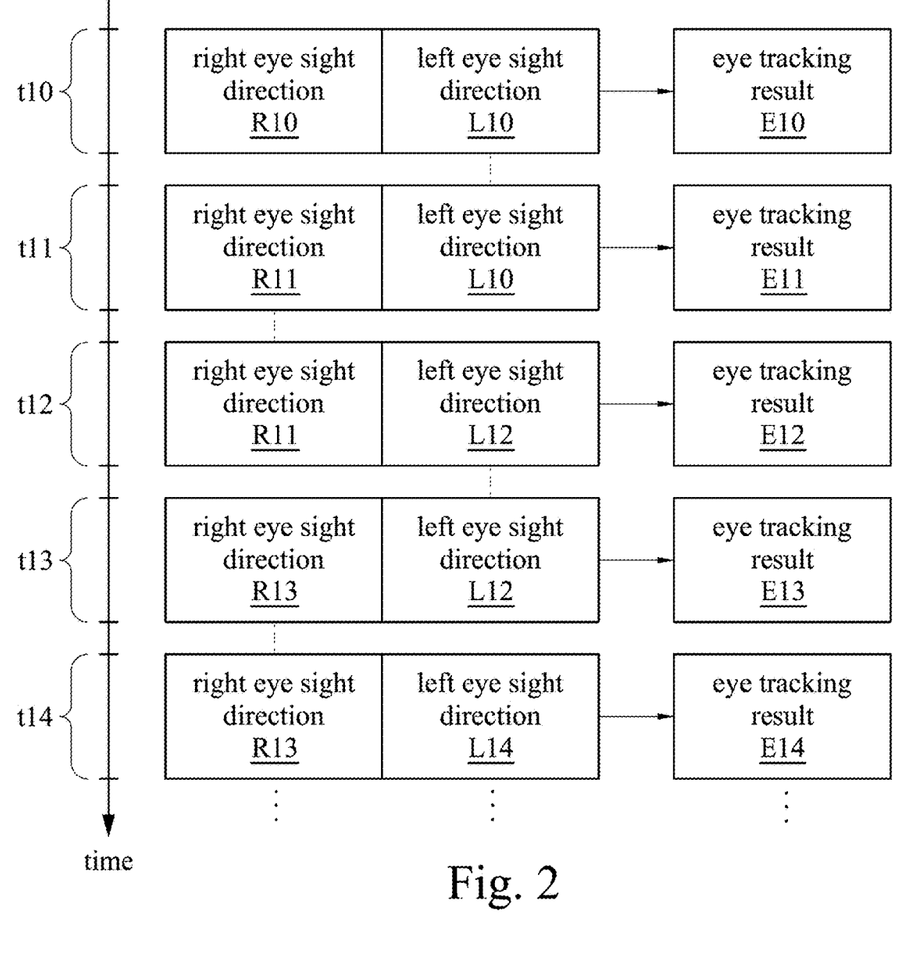
FIG. 2 is a schematic diagram illustrating operations of the eye tracking apparatus generating combine gazes according to some embodiments of the present disclosure.

For clarity, please refer to FIG. 2, which is a schematic diagram illustrating operations of the eye tracking apparatus 1 generating combine gazes E10-E14 according to some embodiments of the present disclosure.

As shown in FIG. 2, first, in the time period t10, the eye tracking apparatus 1 calculates the combined gaze E10 based on a right eye sight direction R10 and a left sight direction L10.

Next, in the time period t11, the eye tracking apparatus 1 tracks the sight direction of the user's right eye through the aforementioned operation and calculate the combined gaze E11 based on a new right eye sight direction R11 and the previous left sight direction L10.

Next, in the time period t12, the eye tracking apparatus 1 changes to track the sight direction of the user's left eye and calculate the combined gaze E12 based on the previous right eye sight direction R11 and a new left sight direction L12.

Similarly, in the time period t13 and t14, the eye tracking apparatus 1 tracks the sight direction of one of the user's eyes and calculate the combined gazes E13 and E14 based on a new sight direction combining with the previous sight direction.

It is noted that, the right eye sight direction R11 is calculated in the time period t11, the left eye sight direction L12 is calculated in the time period t12, the right eye sight direction R13 is calculated in the time period t13, and the left eye sight direction L14 is calculated in the time period t14. In other words, the eye tracking apparatus 1 generates the corresponding combine gazes E11-E14 based on the eye image newly obtained in each of the time periods t11-t14.

In conclusion, in the aforementioned embodiment, the eye tracking apparatus 1 generates a combine gaze (i.e., generate a new combined gaze) through tracking a sight direction of a single eye. Accordingly, compared to generate the combine gaze after the sight directions of both eyes are tracked, the eye tracking apparatus 1 of the present disclosure can shorten the update cycle (i.e., the time period t11-t14) to achieve a higher update rate.

Figure 3:
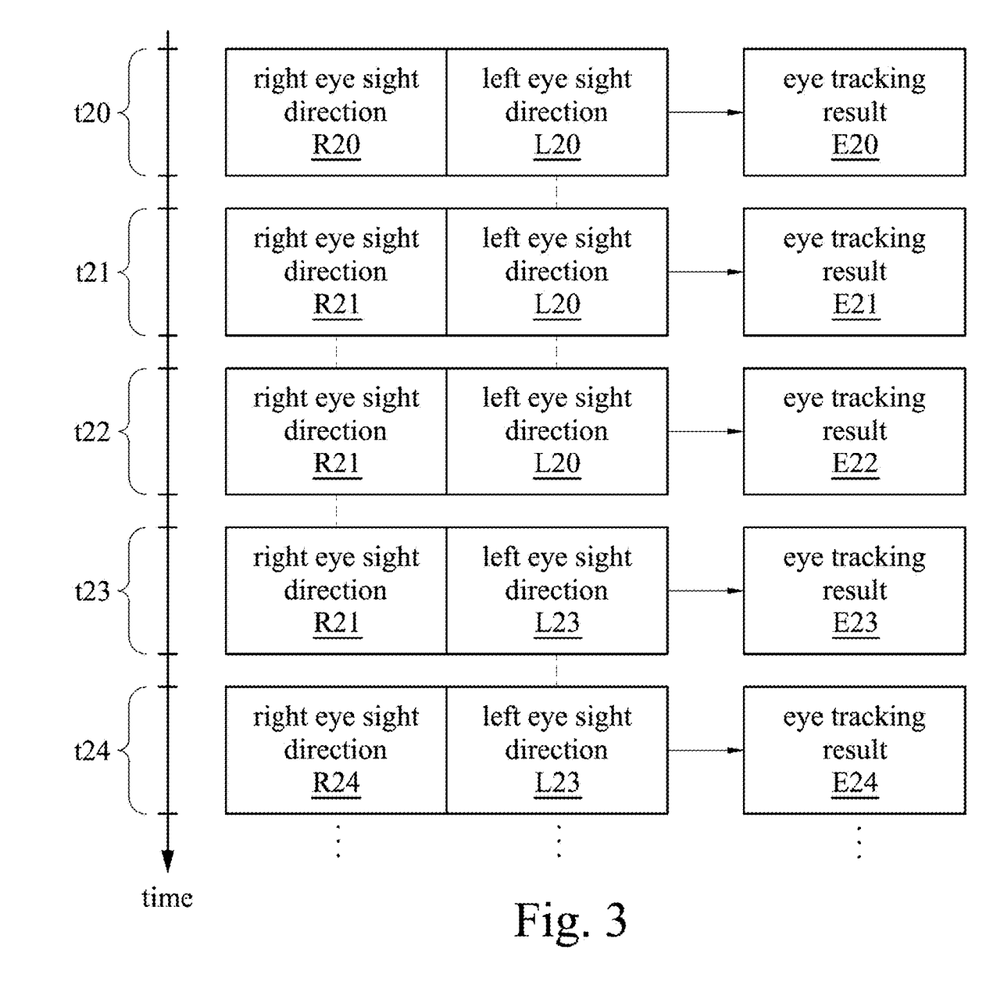
FIG. 3 is a schematic diagram illustrating other operations of the eye tracking apparatus generating combine gazes according to some embodiments of the present disclosure.

In another example, the eye tracking apparatus 1 of the present disclosure tracks the sight direction in a different order to generate the combine gaze. Specifically, the processor 12 generates the combine gaze based on the first sight direction and the second sight direction again before the third time period.

For clarity, please refer to FIG. 3, which is a schematic diagram illustrating other operations of the eye tracking apparatus 1 generating combine gazes E20-E24 according to some embodiments of the present disclosure.

Similar to the operations in FIG. 2, in the time period t20, similar to the operation in the time period t10, the eye tracking apparatus 1 first calculates the combined gaze E20 based on a right eye sight direction R20 and a left sight direction L20. Furthermore, in the time period t21, similar to the operation in the time period t11, the eye tracking apparatus 1 tracks a right eye sight direction of the user and calculates the combined gaze E21 based on a new right eye sight direction R21 and the previous left sight direction L20.

However, the difference between FIG. 2 and FIG. 3 is that, compare to the time period t12 in FIG. 2, in the time period t22 in FIG. 3, the eye tracking apparatus 1 calculates the combined gaze E22 based on the previous right eye sight direction R21 and the previous left sight direction L20. Next, in the time period t23, the eye tracking apparatus 1 calculates the combined gaze E23 based on the previous right eye sight direction R21 and a new left sight direction L23. Furthermore, in the time period t24, the eye tracking apparatus 1 calculates the combined gaze E24 based on a new right eye sight direction R24 and the previous left sight direction L23.

Similarly, the right eye sight direction R21 is calculated in the time period t21, the left eye sight direction L23 is calculated in the time period t23, and the right eye sight direction R24 is calculated in the time period t24. In other words, the eye tracking apparatus 1 generates the corresponding combine gazes E21, E23, and E24 based on the eye image newly obtained in each of the time periods t21, t23, and t24.

It is noted that, in some embodiments, although the combined gazes E21 and E22 are both generated based on the right eye sight direction R21 and the left sight direction L20. However, in practical, the combined gaze may be calculated by referring to other parameters (e.g., predicting the future trajectory based on the trajectory in the past). Therefore, the combined gazes E21 and E22 generated in different time periods may not be the same.

In conclusion, in the example mentioned above, the eye tracking apparatus 1 tracks the sight direction of both eyes every 3 time periods and tracks one eye at a time to generate the combine gaze (i.e., generate a new combined gaze). Accordingly, compare to the embodiment in FIG. 2, the embodiment in FIG. 3 has a lower load under the same update rate (i.e., the same time period).

In the two aforementioned embodiments, the eye tracking apparatus 1 adjusts the frequency of tracking the sight direction (i.e., how many times to calculate the sight direction in the same time period) to control the load of the processor 12. In the same time period, the higher the frequency of tracking the sight direction, the higher the load of the processor 12; and the lower the frequency of tracking the sight direction, the lower the load of the processor 12.

Accordingly, the eye tracking apparatus 1 adjusts the frequency of tracking the sight direction to control the load of the processor 12 based on the operating situation.

Specifically, the processor 12 adjusts the frequency of tracking the sight direction referring to the application executed by the eye tracking apparatus 1. For example, when the eye tracking apparatus 1 is executing the application with higher sight direction update rate (e.g., action game), the processor 12 can increase the frequency to obtain a more instant tracking result; in contrast, when the eye tracking apparatus 1 is executing the application with lower sight direction update rate (e.g., playing video), the processor 12 can reduce the frequency to save the power.

On the other hand, the eye tracking apparatus 1 adjusts the frequency referring to the load of the processor 12. For example, when the processor 12 has a lower load, the frequency can be increased to obtain a more instant tracking result; in contrast, when the processor 12 has a higher load, the frequency can be reduced to save the computing resources.

In some embodiments, the eye tracking apparatus 1 adjusts the cycle of tracking the sight direction to control the update rate (e.g., the frame rate of the display screen) and also control the load of the processor 12.

Specifically, the processor 12 selects one of a plurality of updating cycles; and the processor 12 determines a time interval between the second time point and the third time point based on the one of the updating cycles.

Take FIGS. 2 and 3 as an example, the eye tracking apparatus 1 controls the update rate through adjusting the length of the time periods t10-t14 and t20-t24 (i.e., the update cycle).

It is noticed that, same as the operation of adjusting the frequency of tracking sight directions in the aforementioned embodiment, the eye tracking apparatus 1 can also adjust the update cycle based on application executed, the load of the processor 12, or other factors, and it will not be repeated in the present disclosure.

In some embodiments, to switch between both eyes, the eye tracking apparatus 1 sets a flag value configured to instruct the processor 12 which eye to track the sight direction.

Specifically, the processor 12 selects a first operation or a second operation to generate the combine gaze accordingly based on a flag value; wherein the first operation comprises calculating a sight direction of the first eye and generating the combine gaze based on the sight direction of the first eye; and the second operation comprises calculating a sight direction of the second eye and generating the combine gaze based on the sight direction of the second eye.

Furthermore, the eye tracking apparatus 1 sets the flag value as two different values (e.g., left or right, 0 or 1) corresponding to two eyes relatively. Specifically, the flag value corresponding to a first flag value and a second flag value, the first flag value corresponds to the first operation, and the second flag value corresponds to the second operation.

Furthermore, to switch between the eyes, after complete the eye tracking of one of the eyes, the eye tracking apparatus 1 then sets the flag value as a value corresponding to another eye to instruct the processor 12 to execute the eye tracking of the other eye.

Specifically, in response to completing the first operation, the processor 12 sets the flag value as the second flag value; and in response to completing the second operation, the processor 12 sets the flag value as the first flag value.

Accordingly, the eye tracking apparatus 1 switches between two eyes by using the flag value to execute eye tracking of the eyes in turn.

In summary, after calculating the sight direction of a single eye, the eye tracking apparatus 1 of the present disclosure combines the new sight direction and a previous sight direction of another eye to generate the combine gaze. Compare to generating after calculating the sight direction of both eyes, the eye tracking apparatus 1 of the present disclosure has a higher update rate and provides a better experience to the user. Also, the eye tracking apparatus 1 can further control the load of the processor 12 through adjusting the update rate of calculating the sight direction. Accordingly, the eye tracking apparatus 1 can dynamically control the load of the processor 12 based on the application executed or the current load of the processor 12.

Figure 4:
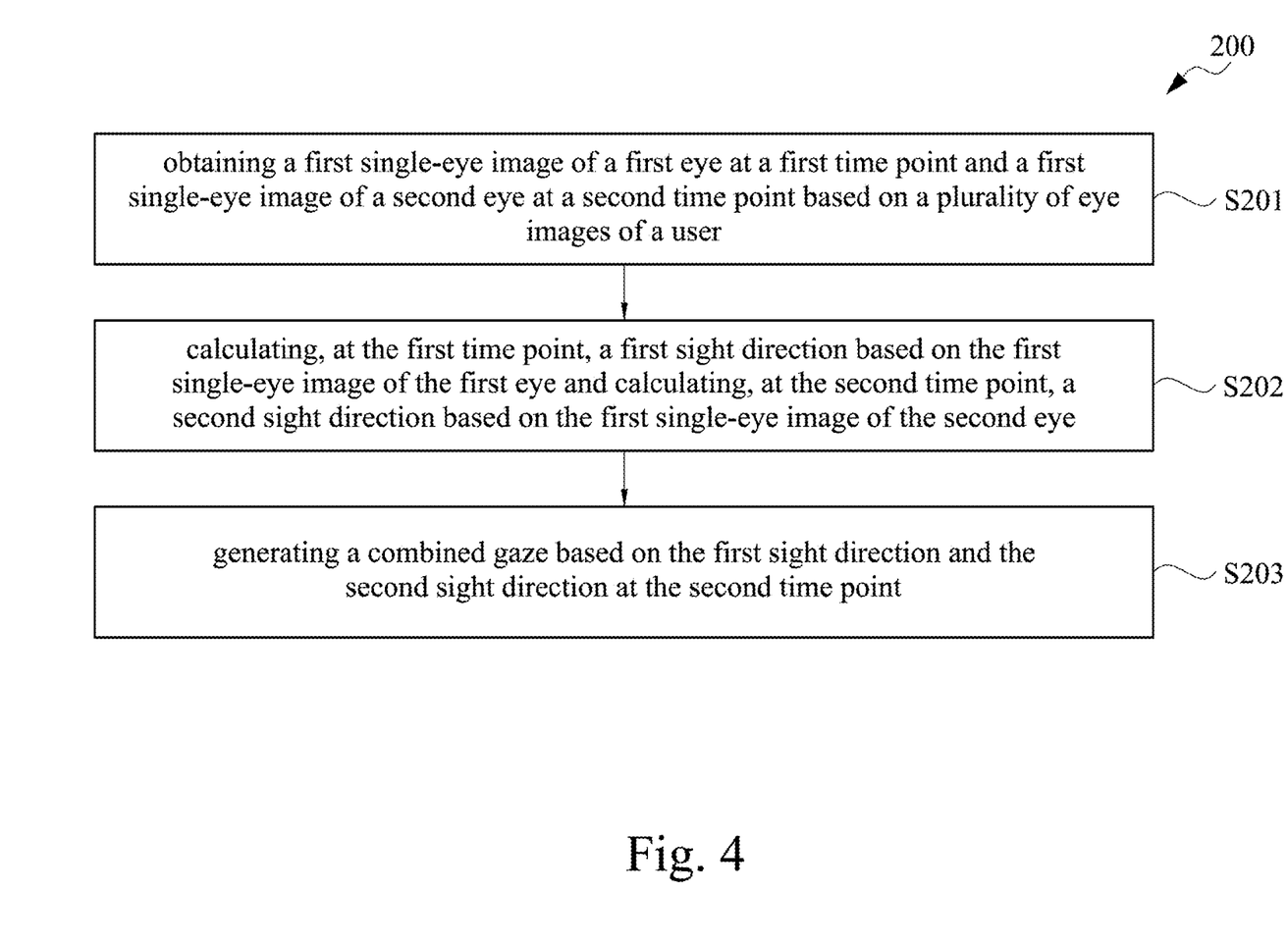
FIG. 4 is a flow diagram illustrating an eye tracking method according to a second embodiment of the present disclosure.

Please refer to FIG. 4, which is a flow diagram illustrating an eye tracking method 200 according to a second embodiment of the present disclosure. The eye tracking method 200 comprises steps S201-S203. The eye tracking method 200 is configured to determine the gaze position of user's eyes based on images of the eyes, wherein the eye tracking method 200 can increase the update efficiency through generating the combine gaze by using a single-eye image. The eye tracking method 200 can be executed by an electronic apparatus (e.g., the eye tracking apparatus 1 shown in FIG. 1).

First, in the step S201, the electronic apparatus obtains a first single-eye image of a first eye at a first time point and a first single-eye image of a second eye at a second time point based on a plurality of eye images of a user.

Next, in the step S202, the electronic apparatus calculates a first sight direction based on the first single-eye image of the first eye and a second sight direction based on the first single-eye image of the second eye at the second time point, wherein the electronic apparatus calculates the first sight direction at the first time point and calculates the second sight direction at the second time point.

Finally, in the step S203, the electronic apparatus generates a combined gaze based on the first sight direction and the second sight direction at the second time point.

In some embodiments, the second time point is later than the first time point.

In some embodiments, the eye tracking method 200 further comprises the electronic apparatus obtaining a second single-eye image of the first eye at a third time point based on the eye images, wherein the third time point is later than the first time point and the second time point; the electronic apparatus calculating a third sight direction based on the second single-eye image of the first eye, wherein the electronic apparatus calculates the third sight direction at the third time point; and the electronic apparatus generating the combined gaze based on the second sight direction and the third sight direction at the third time point.

In some embodiments, the eye tracking method 200 further comprises the electronic apparatus obtaining a second single-eye image of the second eye at a fourth time point based on the eye images, wherein the fourth time point is later than the third time point; the electronic apparatus calculating a fourth sight direction based on the second single-eye image of the second eye, wherein the electronic apparatus calculates the fourth sight direction at the fourth time point; and the electronic apparatus generating the combined gaze based on the third sight direction and the fourth sight direction at the fourth time point.

In some embodiments, the eye tracking method 200 further comprises the electronic apparatus selecting one of a plurality of updating cycles; and the electronic apparatus determining a time interval between the second time point and the third time point based on the one of the updating cycles.

In some embodiments, the eye tracking method 200 further comprises the electronic apparatus generating the combined gaze based on the first sight direction and the second sight direction again before the third time period.

In some embodiments, the step S202 further comprises the electronic apparatus calculating a position of the first eye in the first single-eye image of the first eye to calculate the first sight direction.

In some embodiments, the eye tracking method 200 further comprises the electronic apparatus selecting a first step or a second step to generate the combined gaze accordingly based on a flag value; wherein the first step comprises calculating a sight direction of the first eye and generating the combined gaze based on the sight direction of the first eye; and the second step comprises calculating a sight direction of the second eye and generating the combined gaze based on the sight direction of the second eye.

In some embodiments, the flag value corresponding to a first flag value and a second flag value, the first flag value corresponds to the first step, and the second flag value corresponds to the second step.

In some embodiments, the eye tracking method 200 further comprises in response to completing the first step, the electronic apparatus setting the flag value as the second flag value; and in response to completing the second step, the electronic apparatus setting the flag value as the first flag value.

In summary, after calculating the sight direction of a single eye, the eye tracking method 200 of the present disclosure combines the new sight direction and a previous sight direction of another eye to update the eye tracking result. Compare to updating after calculating the sight direction of both eyes, the eye tracking method 200 of the present disclosure has a higher update rate and provides a better experience to the user. Also, the eye tracking method 200 can further control the load of the electronic apparatus through adjusting the update rate of calculating the sight direction. Accordingly, the eye tracking method 200 can dynamically control the load of the electronic apparatus based on the application executed or the current load of the electronic apparatus.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An eye tracking apparatus, comprising:
    a camera, configured to capture a plurality of eye images of a user in a time sequence; and
    a processor, coupled to the camera, configured to:
        obtain a first single-eye image of a first eye at a first time point and a first single-eye image of a second eye at a second time point based on the eye images;
        calculate, at the first time point, a first sight direction based on the first single-eye image of the first eye and calculate, at the second time point, a second sight direction based on the first single-eye image of the second eye;
generate a combined gaze based on the first sight direction and the second sight direction at the second time point; and
select a first operation or a second operation to generate the combined gaze accordingly based on a flag value;
wherein the first operation comprises calculating a sight direction of the first eye and generating the combined gaze based on the sight direction of the first eye, and
the second operation comprises calculating a sight direction of the second eye and generating the combined gaze based on the sight direction of the second eye.

2. The eye tracking apparatus of claim 1, wherein the second time point is later than the first time point.

3. The eye tracking apparatus of claim 1, wherein the processor is further configured to:
obtain a second single-eye image of the first eye at a third time point based on the eye images, wherein the third time point is later than the first time point and the second time point;
calculate, at the third time point, a third sight direction based on the second single-eye image of the first eye; and
generate the combined gaze based on the second sight direction and the third sight direction at the third time point.

4. The eye tracking apparatus of claim 3, wherein the processor is further configured to:
obtain a second single-eye image of the second eye at a fourth time point based on the eye images, wherein the fourth time point is later than the third time point;
calculate, at the fourth time point, a fourth sight direction based on the second single-eye image of the second eye; and
generate the combined gaze based on the third sight direction and the fourth sight direction at the fourth time point.

5. The eye tracking apparatus of claim 3, wherein the processor is further configured to:
select one of a plurality of updating cycles; and
determine a time interval between the second time point and the third time point based on the one of the updating cycles.

6. The eye tracking apparatus of claim 3, wherein the processor is further configured to:
generate the combined gaze based on the first sight direction and the second sight direction again before the third time point.

7. The eye tracking apparatus of claim 1, wherein an operation of calculating the first sight direction further comprising:
calculating a position of the first eye in the first single-eye image of the first eye to calculate the first sight direction.

8. The eye tracking apparatus of claim 1, wherein the flag value corresponding to a first flag value and a second flag value, the first flag value corresponds to the first operation, and the second flag value corresponds to the second operation.

9. The eye tracking apparatus of claim 8, wherein the processor is further configured to:
in response to completing the first operation, set the flag value as the second flag value; and
in response to completing the second operation, set the flag value as the first flag value.

10. An eye tracking method, being adapted for use in an electronic apparatus, wherein the eye tracking method comprises the following steps:
obtaining a first single-eye image of a first eye at a first time point and a first single-eye image of a second eye at a second time point based on a plurality of eye images of a user;
calculating, at the first time point, a first sight direction based on the first single-eye image of the first eye and calculating, at the second time point, a second sight direction based on the first single-eye image of the second eye;
generating a combined gaze based on the first sight direction and the second sight direction at the second time point; and
selecting a first step or a second step to generate the combined gaze accordingly based on a flag value;
wherein the first step comprises calculating a sight direction of the first eye and generating the combined gaze based on the sight direction of the first eye, and
the second step comprises calculating a sight direction of the second eye and generating the combined gaze based on the sight direction of the second eye.

11. The eye tracking method of claim 10, wherein the second time point is later than the first time point.

12. The eye tracking method of claim 10, further comprising:
obtaining a second single-eye image of the first eye at a third time point based on the eye images, wherein the third time point is later than the first time point and the second time point;
calculating, at the third time point, a third sight direction based on the second single-eye image of the first eye; and
generating the combined gaze based on the second sight direction and the third sight direction at the third time point.

13. The eye tracking method of claim 12, further comprising:
obtaining a second single-eye image of the second eye at a fourth time point based on the eye images, wherein the fourth time point is later than the third time point;
calculating, at the fourth time point, a fourth sight direction based on the second single-eye image of the second eye; and
generating the combined gaze based on the third sight direction and the fourth sight direction at the fourth time point.

14. The eye tracking method of claim 12, further comprising:
selecting one of a plurality of updating cycles; and
determining a time interval between the second time point and the third time point based on the one of the updating cycles.

15. The eye tracking method of claim 12, further comprising:
generating the combined gaze based on the first sight direction and the second sight direction again before the third time point.

16. The eye tracking method of claim 10, wherein the step of calculating the first sight direction further comprising:
calculating a position of the first eye in the first single-eye image of the first eye to calculate the first sight direction.

17. The eye tracking method of claim 10, wherein the flag value corresponding to a first flag value and a second flag value, the first flag value corresponds to the first step, and the second flag value corresponds to the second step.

18. The eye tracking method of claim 17, further comprising:
- in response to completing the first step, setting the flag value as the second flag value; and
- in response to completing the second step, setting the flag value as the first flag value.

* * * * *